United States Patent [19]

Wilhite et al.

[11] Patent Number: 4,858,176
[45] Date of Patent: Aug. 15, 1989

[54] DISTRIBUTOR OF MACHINE WORDS BETWEEN UNITS OF A CENTRAL PROCESSOR

[75] Inventors: John E. Wilhite, Glendale; William A. Shelly, Phoenix, both of Ariz.

[73] Assignee: Honeywell Bull Inc., Phoenix, Ariz.

[21] Appl. No.: 145,845

[22] Filed: Jan. 19, 1988

Related U.S. Application Data

[63] Continuation of Ser. No. 867,352, May 23, 1986, abandoned, and a continuation of Ser. No. 434,126, Oct. 13, 1982, abandoned.

[51] Int. Cl.[4] .............................................. G06F 13/00
[52] U.S. Cl. .................................... 364/900; 364/940
[58] Field of Search ... 364/200 MS File, 900 MS File

[56] References Cited

U.S. PATENT DOCUMENTS

| | | | |
|---|---|---|---|
| 4,250,548 | 2/1981 | Kindell | 364/200 |
| 4,364,025 | 12/1982 | Dalton | 364/200 |
| 4,365,311 | 12/1982 | Fukunaga et al. | 364/900 |
| 4,408,271 | 10/1983 | Kindell | 364/200 |
| 4,454,578 | 6/1984 | Matsumoto et al. | 364/200 |

Primary Examiner—Eddie P. Chan
Attorney, Agent, or Firm—J. H. Phillips; E. W. Hughes

[57] ABSTRACT

A distrbutor for the central execution pipeline unit of a central processor of a data processing system, which central processor has a plurality of execution units. The distributor serves as a communications center by which machine words, such as operands, are transmitted primarily from the cache unit of the central processor unit to execution units and the instruction fetch unit of the central processor unit. Some machine words are transmitted directly from the collector unit to selected units and others are transmitted after being stored in the data register of the distributor. Machine words stored in the data register can be realigned if required by an instruction by character or word alignment switches. The aligned words are then stored in the data register means prior to their being transmitted to units of the central processor. Other sources of signals transmitted by the distributor are the collector unit and registers of the distributor containing the effective address of a target word as calculated by the central execution pipeline unit, as well as copies of machine words in key registers, the A/Q registers, of certain of the execution units.

6 Claims, 1 Drawing Sheet

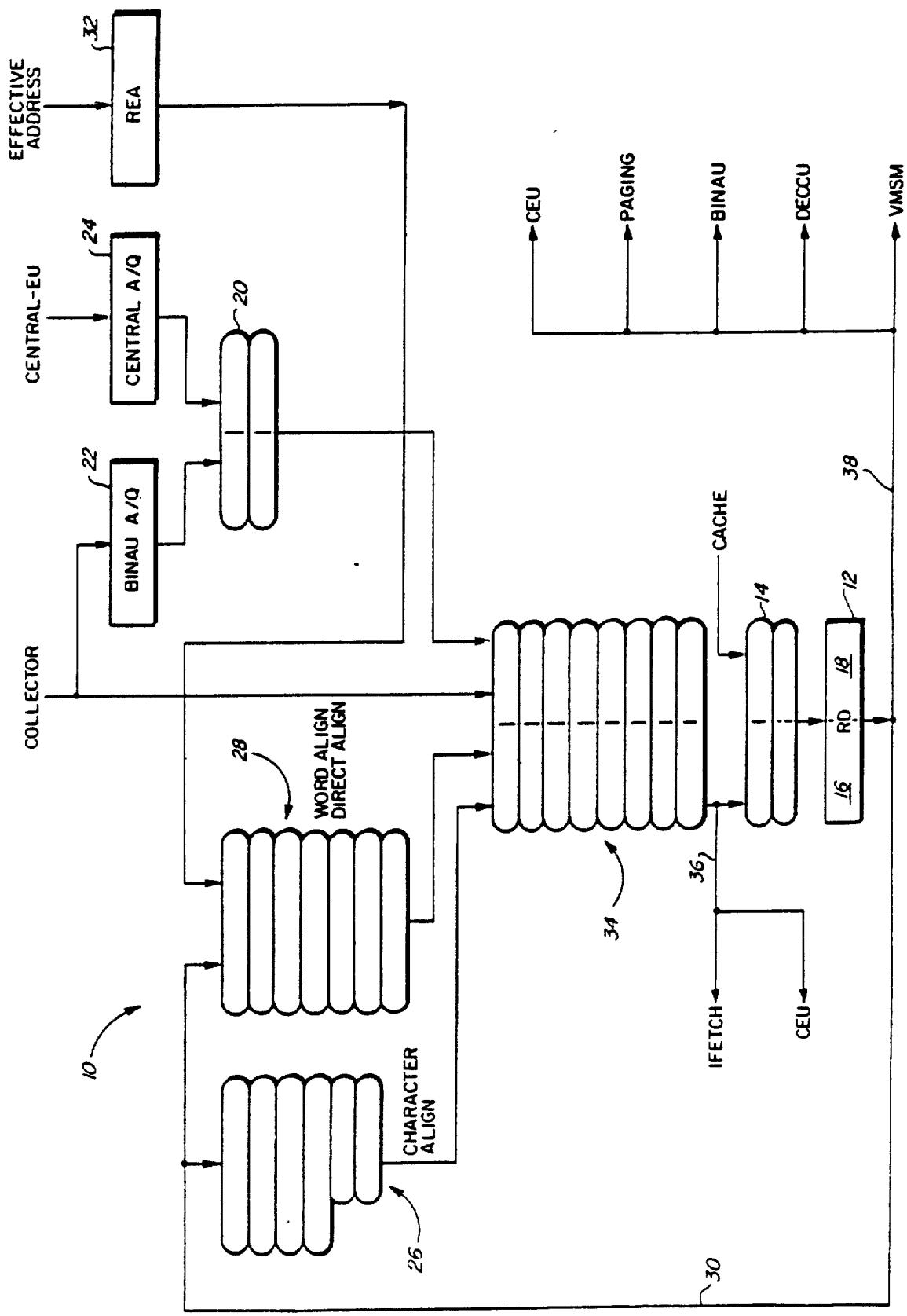

a data register for storing two machine words in two machine-word positions, one the odd and the other the even position. Each machine word, in the preferred embodiment, has 36 bits and is divisible into either six or nine bit characters.

DISTRIBUTOR OF MACHINE WORDS BETWEEN UNITS OF A CENTRAL PROCESSOR

CROSS-REFERENCE TO RELATED APPLICATIONS

This application is a continuation of copending application serial No. 06/867,352 filed on May 23, 1986, which is a continuation of application serial no. 06/434,126 filed on Oct. 13, 1982, now abandoned.

The following copending concurrently filed applications relate to the present application and are incorporated herein by reference:

A. "Central Processor" Ser. No. 434,122, filed Oct. 13, 1982 which issued on June 4, 1985 as U.S. Pat. No. 4,521,851, invented by William A. Shelly and Leonard G. Trubisky;

B. "Method and Apparatus for Prefetching Instructions" Ser. No. 434,197, filed Oct. 13, 1982 which issued on June 10, 1986 as U.S. Pat. No. 4,594,659 invented by Russell W. Guenthner, William A. Shelly, Gary R. Presley-Nelson, and Kala J. Marietta;

C. "Method and Apparatus for Initiating the Execution of Instructions" Ser. No. 434,196, filed Oct. 13, 1982, which issued as U.S. Pat. No. 4,471,432 on Sept. 11, 1984. invented by John E. Wilhite, William A. Shelly, Russell W. Guenthner, Leonard G. Trubisky, and Joseph C. Circello; and D. "Collector" Application Serial No. 434,129, filed Oct. 13, 1982 which issued on June 10, 1986 as U.S. Pat. No. 4,594,660. invented by Russel W. Guenthner, Gregory C. Edgington, Leonard G. Trubisky, and Joseph C. Circello.

All of the foregoing are assigned to the same assignee.

BACKGROUND OF THE INVENTION

1. Field of the Invention.

This invention is in the field of synchronous central processors of large-scale, high-performance, general-purpose digital data processing systems. More particularly, this invention relates to a distributor for the central execution pipeline unit of a central processor, which distributor serves as a communications center by which machine words are transmitted between units of the central processor and which has the capability of aligning machine words as required.

2. Description of the Prior Art.

To increase the performance of the central processors (CPU's) of data processing systems of which they are a part, many modifications and improvements have been incorporated into such CPU's. One such modification is the use of a high-speed cache unit located in the CPU to minimize the time required to fetch operands and instructions. To further increase the performance of CPU's, they are synchronized; i.e., a clock produces a clock pulses which control each step, or stage, of the operation of the CPU. Synchronization permits paralleling, overlapping, or pipelining the execution of instructions by dividing the process of executing each instruction into a number of sequential steps, with each instruction going through the same sequence of steps one after another.

In a CPU having several execution units, with each execution unit being capable of executing a subset of the instruction repertoire of the CPU and which execution units operate substantially independently of each other, it is desirable that the central execution pipeline unit of the CPU initiate the execution of instructions, including the fetching of the operand, or target word, or operands, of each instruction, in a series of steps or stages, each requiring one clock period to complete, and through which each instruction progresses so that, at the completion of the last stage of the central execution pipeline, an instruction and its operands, or target words, are available and ready for execution, or the instruction is executed by the appropriate execution unit.

In order to make the target words of an instruction available and ready for execution by one of the plurality of execution units as each instruction completes its passage through the central execution pipeline unit, there is a requirement that the target words, from whatever the source, and there are more than one, be transmitted to the execution units as expeditiously as possible. Since certain operations, or instructions, require the data in the target word or words to be aligned, alignment of the target word should be accomplished prior to its receipt by the execution unit to which it is addressed. Such a CPU also needs a means for transmitting information between units of the CPU, in addition to the execution units and within the central pipeline execution unit itself, as expeditiously as possible to maximize the performance of the CPU.

SUMMARY OF THE INVENTION

The present invention provides a distributor for the central execution pipeline unit of a synchronous CPU having an instruction fetch unit, a collector unit, a cache unit, and a plurality of execution units. One of the execution units, the central execution unit, performs so-called basic operations, many of which can be performed in a single clock period and the results of which are frequently needed by other units in order that such units can perform their intended functions.

The distributor includes a pair of A/Q registers in which are stored copies of the contents of the A/Q registers of the central and the binary arithmetic execution units, the only two execution units performing operations which change the contents thereof, in the preferred embodiment. The distributor also includes an effective address register in which the effective address of a target word, or words, of an instruction is stored. The signals stored in the A/Q registers are applied to a one of two select A/Q switch which produces as its output the contents of one of the two A/Q registers, the one selected being determined by which position of the A/Q switch is enabled by a control signal. The distributor also includes a data register for storing two machine words in two machine-word positions, one the odd and the other the even position. Each machine word, in the preferred embodiment, has 36 bits and is divisible into either six or nine bit characters.

The alignment function of the distributor is performed by a character alignment switch and a word alignment switch, to which the machine words stored in the data register are applied. The character alignment switch, depending upon which position of the switch is enabled, right justifies in its output word one of the four nine-bit characters, or one of the six six-bit characters of the even-numbered word in the data register. The word alignment switch produces as its output a machine word which, depending upon which position is enabled, is either the odd or the even word stored in the data register, or is a machine word in which the effective address, which consists of 18 bits, is placed in either the upper or lower half of its output word, depending upon which of its positions is enabled.

The outputs of the character and word alignment switches, of the collector unit, and of the A/Q switch, the sources, are applied to a data-in switch which selects as its output, depending upon which position is enabled, a pair of machine words derived from one of the sources. If the selected source provides a single word, the second, or odd, word of the output of the data-in switch is all logical zeros. The output of the data-in switch is transmitted to the central execution unit and the instruction fetch unit. The output of the data-in switch is also an input to a data register switch. A second input of the data register switch is a pair of machine words from the cache unit. The data register switch is a pair of one of four select switches, each pair of which is one machine word wide, and which, depending upon which positions are enabled, can apply any one of the four machine words applied to it for storage in any one or both word positions of the data register. The machine words stored in the data register are transmitted to the character and word alignment switches, as well as to the execution units of the CPU and to the paging logic of the central execution pipeline unit.

It is, therefore, an object of this invention to provide a distributor for a central execution pipeline unit of a CPU for transmitting target words of instructions to the execution units of the CPU.

It is another object of this invention to provide a distributor for a central execution pipeline unit of a CPU which is the communications center for machine words transmitted between units of the CPU.

It is yet another object of this invention to provide a distributor for a central execution pipeline unit of a CPU which aligns machine words before transmitting them to the execution units if required by the instruction to be executed by that execution unit.

BRIEF DESCRIPTION OF THE DRAWING

Other objects, features, and advantages of the invention will be readily apparent from the following description of a preferred embodiment thereof, taken in conjunction with the accompanying drawings, although variations and modifications may be effected without departing from the spirit and scope of the novel concepts of the disclosure in which:

THE sole FIGURE is a schematic circuit diagram of the distributor of this invention.

DESCRIPTION OF THE INVENTION

Referring to THE FIGURE, the primary register of distributor 10 is data register (RD) 12 which functions as the data input register for the execution units of a central processor. The central processor includes as one of its units a central execution pipeline unit (CEPU), of which distributor 10 is a component. The execution units of the CPU, in the preferred embodiment, are the central execution unit (CEU), the binary arithmetic unit (BINAU), the decimal and character unit (DECCU), and the virtual memory, security and Multics unit (VMSM).

The primary input to data register 12 comes from the cache unit of the CPU and consists of two machine words which are applied to, or are inputs to, data register switch 14. In a preferred embodiment, a machine word, or word, is 36 ordered bits and is divisible into four 9-bit characters or six 6-bit characters. A half word is 18 ordered bits. Data register switch 14 is, in the preferred embodiment, two side-by-side one of four select switches, each set of which is one word wide. Data register 12 is two words wide, so that it has the capability of storing the binary signals representing two machine words. Data register 12 has two machine word positions, or portions, which are identified as being even word portion 16 and odd word portion 18.

Other sources of inputs to data register 12 are the collector unit of the CPU and the output of A/Q switch 20, a one-of-two select two words wide switch, which, depending upon which position is enabled, will transmit the signals representing the two words stored in BINAU A/Q register 22 or the two words stored in central A/Q register 24. Two other sources of signals for storage in data register 12 are the outputs of character alignment switch 26 and word-direct alignment switch 28. The signals stored in data register 12 are transmitted, or applied, to word-direct alignment switch 28 by data bus 30. In the preferred embodiment, only the signals of the even-numbered word stored in even word portion 16 of data register 12 are applied to character alignment switch 26. Character alignment switch 26, in the preferred embodiment, is a one of ten select switch one word wide, and word-direct alignment switch 28 is a one of four select switch one word wide.

A second set of input signals applied to word-direct alignment switch 28 is the signals stored in effective address register REA 32. The effective address is that of a target word of an instruction which is developed by the address formation logic of the CEPU of the CPU, which effective address is formed and available at the end of the A cycle of the CEPU. The effective address, in the preferred embodiment, is an 18-bit binary number, or a half word, and is used by the word-direct alignment switch 28 to form the operand of "direct" operations or instructions.

The outputs from character alignment switch 26, word-direct alignment switch 28, each of which are one machine word, and the outputs from A/Q switch 20 and the collector, which are two words, are the sources of the input signals to data-in switch 34, a one of five select switch two words wide. The output of data-in switch 34, which is two words, is applied to data register switch 14 as its second set of input signals. The two sources of signals to data register switch 14 then are the cache unit and the output of switch 34. The output of data-in switch 34 is also applied to, or transmitted over, data bus 36 to the instruction fetch unit and central execution unit of the CPU. The signals stored in data register 12, two machine words, are applied to, or transmitted over, data bus 38 to the four execution units of the central processor; namely, the central execution unit (CEU), the binary and arithmetic unit (BINAU), the decimal and character unit (DECCU), and virtual memory, security and Multics unit (VMSM). Register 12 is also the source of data transmitted over bus 38 to other components of the CEPU, such as its paging logic.

As pointed out above, the primary source of input signals, machine words, to data register 12 is the cache unit. Whenever the target word of an instruction is in the cache, or there is a cache hit, the target or addressed words are transmitted from the cache unit two words at a time, or as a double word. If a single word is all that is required by the identified, or designated, execution unit which will be executing, or implementing, the instruction, appropriate control signals enable the correct switch positions of switch 14 to apply the signals of only one of the two target words received from the cache unit to data register 12 for storage in either its even position 16 or odd position 18. Normally, when a single word is all that is required for a single precision operation, for example, that word is stored in both the even position and the odd position.

If a cache miss occurs, i.e., the target words are not in the cache unit, an input of a double word from the collector unit is applied to data register 12 through data switch 34 and data register switch 14. When a cache miss occurs, the addressed words are obtained from the random access memory of the computer system, of which the CPU is a subsystem, and are transmitted to the cache unit of the CPU by the collector unit. To minimize interruptions to the operation of the central processor under such circumstances, the addressed words of a block of eight such words, containing the addressed words being written into the cache unit, are transmitted by the collector to distributor 10 for storage in data register 12 by enabling the one switch position of data-in switch 34 that causes the signals from the collector unit to appear as the output of data-in switch 34. The output of switch 34 is also applied to, or present on, data bus 36 so that it is available to the instruction fetch unit and the central execution unit. Thus, the instruction fetch unit and the central execution unit will be enabled to receive the machine words from data bus 36. This is important in minimizing any delays caused by a cache miss if the target words are instructions needed by the instruction fetch unit to prevent a break in the pipeline, or in the operation of the CEPU. Similarly, delays caused by a cache miss are minimized if the target words or operands are needed by the central execution unit so that it can complete an operation.

Another function of distributor 10 is to maintain current copies of the A/Q registers of the execution units that perform operations on, or use, the A/Q registers in the performance of their operations. BINAU A/Q register 22 stores the latest copy of the contents of the A/Q registers of the BINAU execution unit, which information is transmitted to register 22 from the collector unit. The central A/Q register 24 is updated directly from the CEU one cycle after the contents of either the A or the Q registers of the central execution unit are changed.

Effective address register REA 32 has stored in its signals representing the effective address as developed by the address formation logic of the CEPU. For all direct operations, the effective address is, or forms, a part of the operand of the instruction with the effective address occupying either the upper half, the higher order bit positions of a machine word, or the lower half, the lower order bit positions of such a word. To form the required direct operand, one or the other of two positions of word-direct alignment switch 28 is enable by appropriate control signals so that the output word has the effective address from REA 32 in either its upper or lower half. Word-direct alignment switch 28, depending upon which of its positions is enabled by appropriate control signals, will produce as its output the even or odd words stored in register RD 12 or a direct operand. The output from switch 28, when selected by the enabling of the appropriate positions of switches 34 and 14, can be stored in either the even or the odd position of data register RD 12.

Character alignment switch 26 selects, depending upon which of its positions is enabled, one of the four 9-bit characters or one of the six 6-bit characters of a machine word, the even machine word, stored in register 12, and right justifies the selected character in the output word of switch 26. All higher order bit positions of the output of character alignment switch 26 are forced to be logical zeros. The output of character alignment switch 26 passes through data-in switch 34 to data register switch 14 for storage in the even word position 16 and the odd word position 18.

The target words of an instruction from the cache unit for an execution unit other than the central execution unit pass through data register switch 14. During their passage through switch 14, these words can be aligned in response to alignment control signals applied to switch 14. From switch 14, the target words are stored into data register 12. The target words stored in data register 12 are then transmitted to the designated execution unit over bus 38 during the E/T cycle of the CEPU. The target words from the collector on a cache miss are also transmitted to the instruction fetch unit and the central execution unit over bus 36. The reason for the direct transmission, under these circumstances, is that the instruction fetch unit and the central execution unit are the most critical units in achieving maximum performance of the CEPU.

Distributor 10 also has the capability of transmitting operands directly to the central execution unit, examples being direct operands and, in the case of a double word operation, of transmitting the even or the odd word to the central execution unit and, in a succeeding clock period, the other of the two target words. The distributor also aligns characters of target words for those instructions which modify or act on a character. In such circumstances, it is necessary to write the correct target word into data register 12 with the word in which the character to be operated on is located being positioned in the even word position 16 of data register 12. This word is then transmitted to character alignment switch 26 and, depending upon which position of switch 26 is enabled, switch 26 selects the desired character whether one of six 6-bit or one of four 9-bit characters which is right justified in the output word of switch 26.

From the foregoing, it is believed obvious that the distributor of this invention provides a central communication link, or hub, that permits fast communication of information between the units of a CPU having a plurality of execution units to maximize the performance of the CPU.

It should be evident that various modifications can be made to the described invention without departing from the scope thereof.

What is claimed is:

1. A distributor for a central execution pipeline unit of a central processor having a plurality of execution units including a central execution unit, said central processor also including an instruction fetch unit, a cache, and a collector; and cache, collector, and central execution pipeline units being sources of signals representing machine words applied to the distributor; said distributor comprising:
   first switch means for producing a pair of first switch means output machine words selected from signals applied to the first switch means;
   data register means including an even numbered register and an odd numbered register for storing a pair of machine words, one machine word being stored in the even numbered register and one machine word being stored in the odd numbered register thereof;

second switch means for producing as its output two second switch means output machine words selected from said first switch means output machine words or two machine words from the cache, and for applying said second switch means output words for storage in the registers of said data register means;

character alignment switch means to which a machine word from a data register of said data register means is applied for producing character alignment switch means output signals which includes a character of the machine word applied thereto;

word alignment switch means to which both machine words stored in data registers of the data register means are applied for producing a word alignment means output machine word;

sources of signals applied to the first switch means including machine words from the collector, the central execution unit, the word alignment switch means, and signals from the character alignment switch means;

means for transmitting the first switch means output machine words to the instruction fetch unit and the central execution unit; and means for transmitting machine words stored in the data register means to the execution units.

2. A distributor as defined in claim 1 in which a character comprises a predetermined number of bits.

3. A distributor as defined in claim 2 in which the predetermined number of bits is nine.

4. A distributor as defined in claim 2 in which the predetermined number of bits is six.

5. A distributor as defined in claim 2 in which a machine word consists of 36 bits.

6. A distributor for a central execution pipeline unit of a central processor having an instruction fetch unit, a collector unit, a cache unit, and a plurality of execution units, one of said execution units being a central execution unit, said distributor comprising:

first A/Q register means for storing signals of machine words which are copies of an A/Q register of one of said first execution units;

second A/Q register means for storing signals of machine words which are copies of an A/Q register of the central execution unit;

A/Q switch means to which the signals stored in the first and second A/Q register means are applied for producing as a switch means output, the signals of the A/Q switch means output being those of the machine words stored in the first or second A/Q register means;

effective address register means for storing signals which are an effective address of a machine word;

data register means having an even word portion and an odd word portion for storing signals of a pair of machine words, the word stored in the even portion register being designated as an even numbered word, and the word stored in the odd portion register being designated as an odd numbered word;

character alignment switch means to which signals representing one of the machine words stored in the data register means are applied for selecting as a character alignment switch means output, signals representing a designated one of the characters of the applied machine word;

word alignment switch means having a plurality of positions each of which when enabled determines the output of said switch and to which alignment switch means are applied signals representing machine words stored in the data register means, signals representing the effective address from the effective address register means, said word alignment switch means selecting as a word alignment switch means output, signals corresponding to one of the two machine words, or the effective address signals which effective address signals can occupy two different positions in the word alignment switch means output depending upon which of two different positions of the word alignment switch means is enabled;

data switch means to which the A/Q switch means output, the character alignment switch means outputs, the word alignment switch means output and signals from the collector are applied for producing data switch means output signals representing two machine words;

data register switch means to which the data switch means output signals and signals of two machine words from the cache unit are applied for selecting signals representing two machine words and for applying the selected signals to the data register means for storage therein;

means for transmitting the signals stored in the data register means to the execution units; and means for transmitting the data switch means output signals to the central execution unit and the instruction fetch unit.

* * * * *